June 17, 1930.  E. L. HOFFMAN  1,764,044
SEPARABLE FASTENER
Filed Nov. 29, 1929
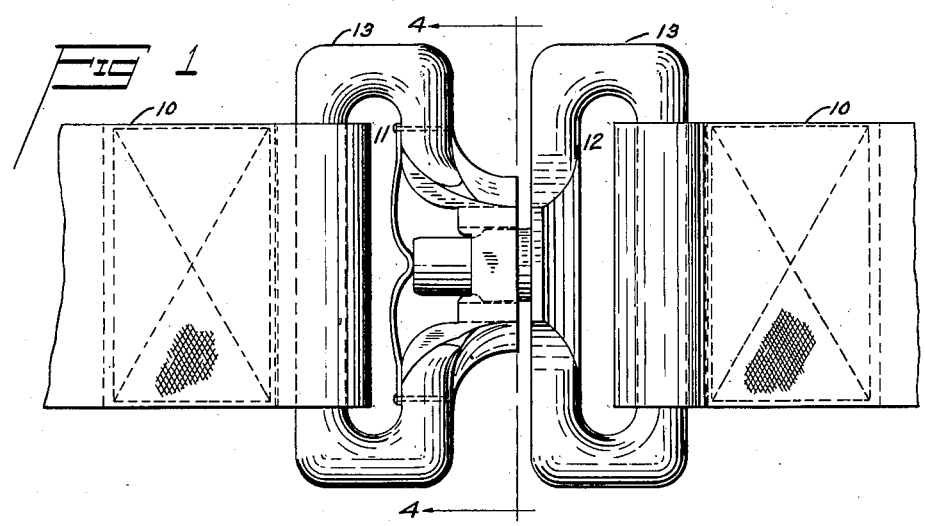
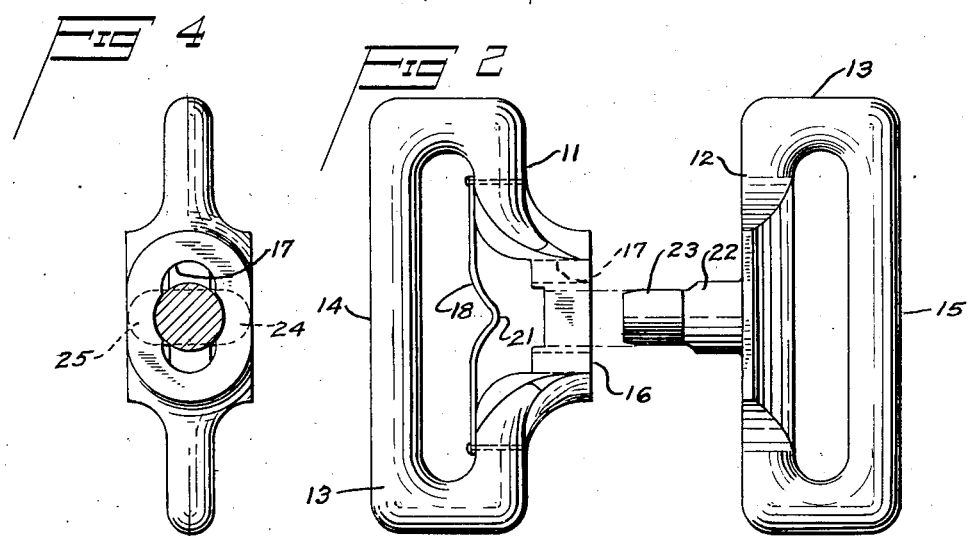
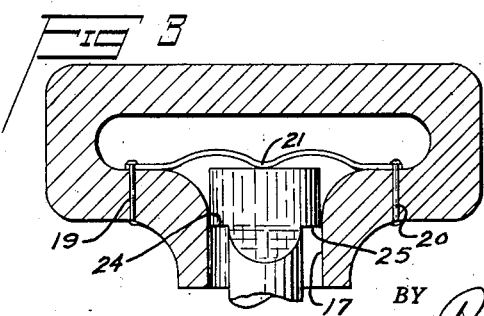
INVENTOR
Edward L. Hoffman.
BY
ATTORNEY Patented June 17, 1930

1,764,044

UNITED STATES PATENT OFFICE

EDWARD L. HOFFMAN, OF DAYTON, OHIO

SEPARABLE FASTENER

Application filed November 29, 1929. Serial No. 410,615.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates generally to improvements in fastening devices and more particularly has as its principal object the provision of a separable fastener of an improved quick acting type which will not readily become accidentally disengaged.

A further object of the invention is to provide a separable fastener composed of a minimum of parts so constructed as to be readily secured together and readily separated and yet capable of withstanding a heavy pull or strain when connected together.

A still further object of the invention is to provide a separable fastener for belts wherein the fastener elements have interlocking engagement with one another.

Another object of the invention is to provide a novel and improved separable fastener of this general character including a tongue carrying member adapted for separable connection with a holding member and wherein the holding member is provided with means co-acting with the tongue-carrying member to maintain the members tensioned against accidental displacement or separation when in interlocking engagement.

A still further object of the invention is to provide a separable fastener of the head and socket type wherein the socket is provided with resilient means and the head is substantially rigid and yet rotatable within the socket, as, for instance, a quarter turn to unlock and lock the head in the socket.

The invention consists in the details of construction and in the combination and arrangement of the several parts of my improved separable fastener whereby certain important advantages are attained and the device rendered simpler, less expensive, and otherwise more convenient and advantageous for use, as will be hereinafter more fully set forth.

The novel features of my invention will hereinafter be definitely claimed.

In order that my invention may be better understood, reference may be had to the accompanying drawings wherein:

Fig. 1 is a plan elevation of the separable fastener in an embodiment of my invention in a locked position.

Fig. 2 is a disassembled elevational view.

Fig. 3 is a transverse sectional view of the holding member and spring illustrating a portion of the tongue in elevation and in position prior to the locking movement.

Fig. 4 is a sectional view taken on the line 4—4 of Fig. 1.

Referring more particularly to the drawing in which corresponding numerals designate like parts throughout the various views thereof, numeral 10 generally indicates a belt or strap which may be of any desired kind; for instance a safety belt for window cleaners, fire men, or the straps of a parachute harness as used by aviators and other persons engaged in more or less hazardous undertaking. In providing a belt for persons of this character the belt must be sufficiently strong to stand the weight of a person and the fastener holding the ends of the straps together should be strong enough to support at least the weight of the person using the harness and also must be capable of quick disengagement in case of any emergency arising.

In carrying out the present invention, I have provided a connector mechanism comprising two separable members 11 and 12, each member being provided with a link portion respectively as indicated by numeral 13, each of said link portions being formed with a cross bar 14 and 15 adapted to accommodate the strap or other flexible member 10 heretofore mentioned. The link portions and cross bar are preferably so shaped as to accommodate a flat strap, but they can be readily made round in order to better receive a cord, cable, bar or the like most suitable for the purpose desired. The member 11 hereinafter to be referred to as the holding member comprises a socket portion 16 having an oblong opening 17 arranged therein. The holding member is also provided with resilient means such as a spring 18 secured to the link portion of the holding member by rivets 19 and 20. The spring 18 is formed with a projecting portion 21 adapted to overlie the opening 16, the purpose of which will be hereinafter more fully described.

The tongue carrying member 12 comprises a shank 22 having a T-shaped head 23 provided with shoulders 24 and 25, the shape of the head conforming approximately to the shape of the oblong opening in the holding member.

From the foregoing description, it will be apparent that when the head 23 of the tongue-carrying member is inserted into the socket of the holding member, the T-shaped head will engage with the projecting portion 21 of the spring 18 and will push the spring forward to tension it. After the head 23 has been pushed a sufficient distance into the socket the head is given a quarter turn or a turn through 90° whereby to bring the head into alignment with notches 26 forming a shallow recess provided in the socket portion of the holding member, said notches extending at right angles to the oblong opening. In the position, as illustrated in Fig. 1, accidental disengagement of the tongue-carrying member from the holding member is prevented. To release the parts, the head and socket are held in the hands and a quarter turn is given to one or the other for the purpose of releasing the head from the socket.

Having thus fully described my invention, what I claim as new and desire to secure by Letters Patent is:—

A separable fastener composed of a male and female member each comprising a loop including a cross bar for the reception of the ends of a strap, the male member having a locking lug extending from the side of the loop opposite to that of the cross bar, the female member having a socket portion extending from the loop from the side opposite to that of the cross bar, and having an opening formed therein for the reception of the locking lug, said female member, also having a shallow recess adapted to seat the locking lug when said members are in a locked position, and a restraining means on the inner face of the loop of the female member, and spaced from the cross bar of the loop, the said restraining means spanning the inner end of the opening in the socket portion to engage the locking lug when inserted through said opening and rotated into said shallow recess.

In testimony whereof I affix my signature.

EDWARD L. HOFFMAN.